US009549131B2

(12) United States Patent
Idaka

(10) Patent No.: US 9,549,131 B2
(45) Date of Patent: Jan. 17, 2017

(54) IMAGING APPARATUS AND IMAGING METHOD USING INDEPENDENTLY CORRECTED COLOR VALUES

(75) Inventor: Yuujirou Idaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 553 days.

(21) Appl. No.: 13/281,080

(22) Filed: Oct. 25, 2011

(65) Prior Publication Data

US 2012/0105666 A1     May 3, 2012

(30) Foreign Application Priority Data

Oct. 28, 2010  (JP) ................................. 2010-242160
Apr. 21, 2011  (JP) ................................. 2011-095166

(51) Int. Cl.
H04N 9/64      (2006.01)
H04N 5/217     (2011.01)
H04N 5/228     (2006.01)
H04N 5/361     (2011.01)
H04N 9/04      (2006.01)

(52) U.S. Cl.
CPC ............. H04N 5/361 (2013.01); H04N 9/045 (2013.01)

(58) Field of Classification Search
CPC ........ H04N 5/361; H04N 5/378; H04N 5/185; H04N 5/3658; H04N 5/18; H04N 9/045
USPC ...................... 348/222.1, 241, 242–243, 250, 226.1,348/255
See application file for complete search history.

(56) References Cited

U.S. PATENT DOCUMENTS

| 6,157,407 | A  | * | 12/2000 | Kobayashi ..................... 348/241 |
| 8,537,233 | B1 | * | 9/2013  | Li ............................... 348/222.1 |
| 2002/0021356 | A1 | * | 2/2002 | Nakashima ..................... 348/65 |
| 2006/0044424 | A1 | * | 3/2006 | Shirai et al. ................... 348/241 |
| 2007/0216778 | A1 | * | 9/2007 | Hatani et al. .............. 348/222.1 |
| 2008/0273101 | A1 | * | 11/2008 | Takenaka et al. ............ 348/243 |
| 2010/0026860 | A1 | * | 2/2010 | Oshima .................. H04N 5/361 348/243 |

FOREIGN PATENT DOCUMENTS

| JP | H08-321970 A | 12/1996 |
| JP | 2000-358170 A | 12/2000 |
| JP | 2003-116143 A | 4/2003 |
| JP | 2006-165709 A | 6/2006 |

* cited by examiner

Primary Examiner — Twyler Haskins
Assistant Examiner — Carramah J Quiett
(74) Attorney, Agent, or Firm — Canon USA, Inc. IP Division

(57) ABSTRACT

An imaging apparatus includes an image sensor, an AD conversion unit, a clamp processing unit, and a video signal correction unit. The clamp processing unit is configured to clamp to a black level, an image signal of an effective pixel region or an optical-black region of the image sensor after having been digitally converted by the AD conversion unit, by evaluating a difference from a signal of the optical-black region. The video signal correction unit is configured to calculate signal information of a part or whole of the optical-black region of an image signal of the image sensor; and, independently for each color of the video signal, to calculate correction amount of a video signal using the signal information, and to carry out correction by subtracting calculated correction amount from the image signal before clamping operation performed by the clamp processing unit.

11 Claims, 9 Drawing Sheets

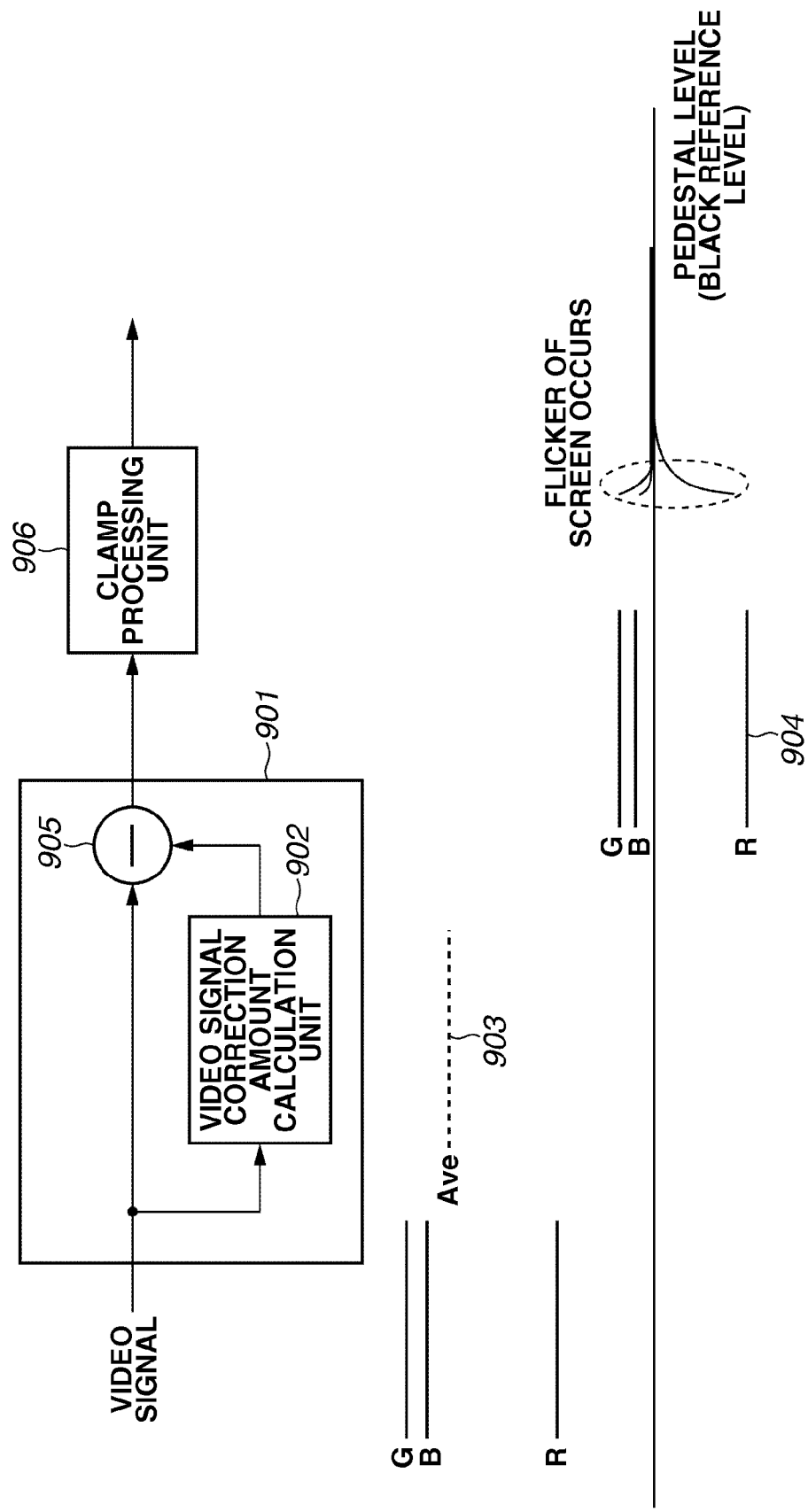

IMAGING APPARATUS AND IMAGING METHOD USING INDEPENDENTLY CORRECTED COLOR VALUES

BACKGROUND OF THE INVENTION

Field of the Invention

Embodiments of the present invention relate to an imaging apparatus and an imaging method and, more particularly, to a technology suitable for use in an imaging apparatus having a clamping function.

Description of the Related Art

Herein below, the prior art will be described. The conventional imaging apparatus includes a lens that causes an incident light to form an image, an image sensor that converts an optical image formed by the lens into an electrical signal, and a signal processing unit that obtains a predetermined image signal by effecting various signal processing, after analog-to-digital (AD) conversion of the electrical signal obtained from the image sensor. Furthermore, the conventional imaging apparatus includes a clamp processing unit for compensating a black level of a video signal after the AD conversion processing. The clamp processing unit implements clamp processing, by using the video signal in an optical-black region shielded from light, of the image sensor.

A dynamic range exists in the clamp processing unit. When a signal of equal to or higher than a certain signal level, or a signal of equal to or lower than the signal level is input into the clamp processing unit, the value will exceed a range within which clamp processing is enabled. As a result, the clamp processing unit may not appropriately perform the clamp processing. When the signal level is amplified by an amplifier circuit at a front stage of the clamp processing unit, because of, for example, high temperature of the image sensor is, and significant dark current shot noise, the video signal may exceed the dynamic range before input of the clamp processing unit. In this case, the imaging apparatus only needs to offset the video signal at the front stage of the clamp processing unit, and to perform processing for causing the video signal to fall within the dynamic range of the clamp processing unit. A technology relating to clamp processing of the imaging apparatus is discussed in, for example, Japanese Patent Application Laid-Open No. 2000-358170.

An imaging apparatus discussed in Japanese Patent Application Laid-Open No. 2000-358170, based on an average value of signal levels of an optical-black portion of an image sensor in an image signal, corrects the signal level of the image signal. Then, the imaging apparatus subtracts the video signal before the clamp processing, and implements processing for causing the video signal to fall within the dynamic range of the clamp processing unit.

However, in a case where the imaging apparatus, when determining an average value (correction amount), in this manner, calculates an unique correction amount in a mix of four colors (R, Gr, Gb, and B) of sensor output video signal, and subtracts the same correction amount from the entire video signal, the following problems occur. The clamp processing unit is composed of a recursive type filter circuit, and has a certain time constant. Recursive processing requires a time according to the time constant to clamp the entire screen by a video signal of an optical-black region serving as a reference signal.

When the unique correction amount as described above is subtracted from the video signal, difference of video signals for each color after subtraction may becomes large. In a case where the video signal has entered into the clamp processing unit, it requires a time according to the time constant of the recursive type filter, to perform clamping. For this reason, the clamp processing unit may not instantaneously withdraw the video signal to a pedestal level, and there is a problem that a flicker occurs in a portion of the screen failed to withdraw.

Such a phenomenon occurs particularly on the condition under which level difference for each of four colors is likely to occur, such as a case where a gain of the amplifier at the front stage of the clamp processing unit is great, due to a high temperature and a low illuminance. When the time constant of the recursive type filter of the clamp processing is made short, for the purpose of countermeasures against the above-described problem, conversely, adverse effect of erroneous clamping occurs resulting from, for example, dark current and shot noise.

It is, therefore, desirable to enable appropriate clamp processing, even when the video signal which exceeds the dynamic range of the clamp processing has been input, without the need to make short the time constant of the recursive filter of the clamp processing unit.

SUMMARY OF THE INVENTION

According to an aspect of embodiments of the present invention, an imaging apparatus includes an image sensor, an AD conversion unit, a clamp processing unit, and a video signal correction unit. The image sensor has an effective pixel region and an optical-black region and is configured to convert an input light signal into an electrical signal. The AD conversion unit is configured to digitally convert the electrical signal output from the image sensor. The clamp processing unit is configured to clamp to a black level, an image signal of the effective pixel region or the optical-black region after having been digitally converted by the AD conversion unit, by evaluating a difference from a signal of the optical-black region. The video signal correction unit is configured to calculate signal information of a part or whole of an optical-black region of an image signal of the image sensor, and correction amount of a video signal using the signal information, and to carry out correction by subtracting calculated correction amount from the image signal before clamping operation performed by the clamp processing unit. The video signal correction unit calculates correction amount independently for each color of the video signal, and performs correction processing independently for each color of the video signal.

Further features and aspects of the embodiments of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a diagram illustrating a concept of performing correction processing in a mix of four colors on the video signal correction amount.

DESCRIPTION OF THE EMBODIMENTS

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

A first exemplary embodiment will be described. Herein below, preferred exemplary embodiments of the present invention will be described in detail based on the accompanying drawings.

Figure 1:
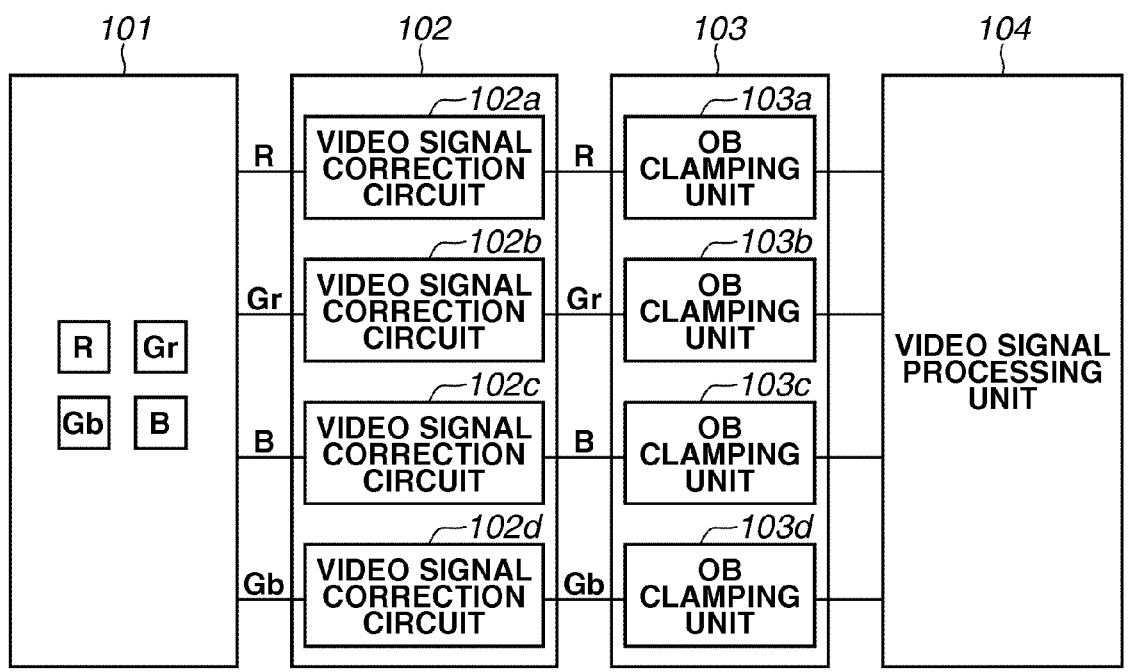
FIG. 1 is a diagram illustrating an example of a schematic configuration of an imaging apparatus that performs correction processing for each color.

First, referring to FIG. 1, an outline of an imaging apparatus according to the present exemplary embodiment that implements clamp processing for each color will be described.

An image sensor 101 is used to convert an input light signal into an electrical signal to output it. In the present exemplary embodiment, color filters for four colors (R, Gr, Gb, and B) in a Bayer array are constituted on a photo transistor of the image sensor. Accordingly, from the image sensor 101, video signals are output at four channels in total for each color of R, Gr, B, and Gb. A video signal correction unit 102 has video signal correction circuits 102a through 102d disposed for four channels in total, to perform correction processing for each color of four channels output from the image sensor 101. Respective correction circuits implement video signal correction processing independently for each color. In the video signal correction unit 102, the video signal correction processing is effected for each color, and subsequently the video signal is input into a clamp processing unit 103, where clamp processing is implemented.

The clamp processing unit 103 includes therein OB clamping units 103a through 103d for four channels composed of the recursive type filters, to enable the clamp processing to be implemented independently for each color. A pixel signal in an OB region 402 (see FIG. 4) is input into the clamp processing unit 103. Then, the clamp processing unit 103 subtracts an output value to be updated for each horizontal line of the sensor output video signal of the same circuit from a video signal in an effective pixel region 404 (see FIG. 4).

Figure 2:
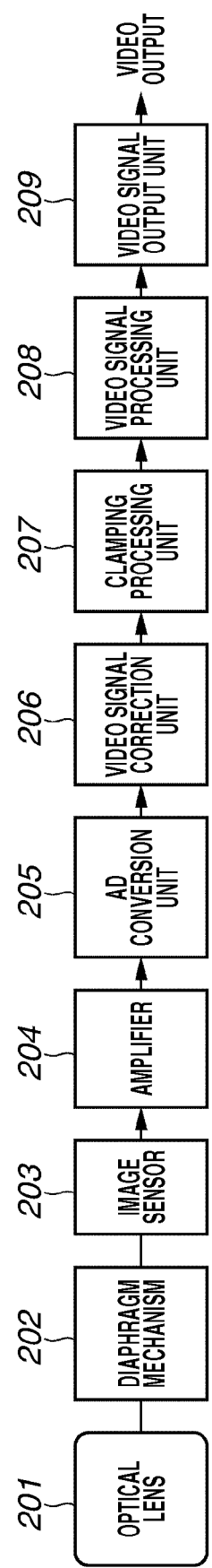
FIG. 2 is a block diagram illustrating a first exemplary embodiment, and illustrating a configuration example of a digital imaging apparatus.

FIG. 2 is a block diagram illustrating a schematic configuration of a digital imaging apparatus according to an embodiment of the present invention. In FIG. 2, the digital imaging apparatus includes an optical lens 201 that forms an optical image of an object, a diaphragm mechanism 202 that adjusts an amount of a light which has passed through the lens, an image sensor 203 that converts an image of the object into an electrical signal, and an amplifier 204 that amplifies the video signal.

The digital imaging apparatus further includes an AD conversion unit 205 that digitally converts an imaging apparatus output signal, a video signal correction unit 206, and a clamp processing unit 207 for clamping a black level of signals. The clamp processing unit 207 according to the present exemplary embodiment, as described below, performs clamp processing for clamping, to a black level, an image signal in an effective pixel region or an optical-black region after having been digitally converted, by evaluating a difference from a signal in the optical-black region. A video signal processing unit 208 performs image processing on video signals such as development processing or white balance (WB) processing. A video signal output unit 209 outputs, to the outside, video signals output from the video signal processing unit 208, in a format of the video signal or the like.

In a case where a dynamic range exists in the clamp processing unit 207, and a signal which exceeds the dynamic range is input, appropriate clamp processing may not be performed. For example, a case where temperature of the image sensor 203 is high, and the dark current and shot noise are significant, or a case where a low illuminance object is captured and the video signal is amplified by the amplifier 204. The video signal correction unit 206 subtracts a certain value from the entire screen at one-screen-period so that the video signal falls within the dynamic range of the clamp processing unit 207. Through the processing, the imaging apparatus causes the video signal to fall within the dynamic range of the clamp processing unit 207, and implements appropriate clamp processing.

Figure 3:
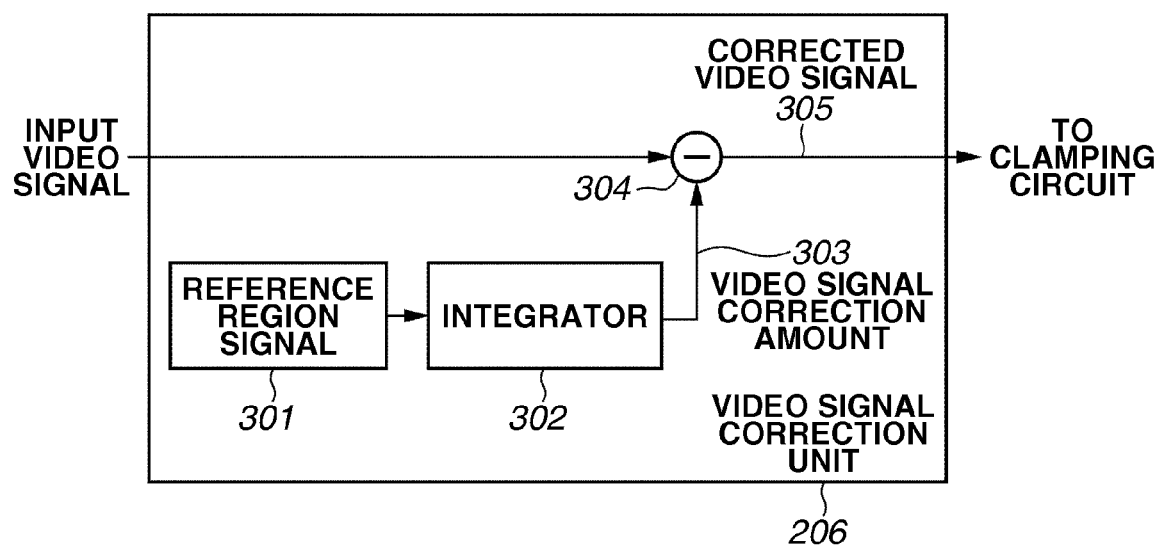
FIG. 3 is a block diagram illustrating a detailed configuration example of a video signal correction unit.

FIG. 3 is a diagram illustrating a detailed configuration of the video signal correction unit 206. An integrator 302 inputs a reference region signal 301 in a particular reference region of the image sensor to determine an integrated value of signal information, and outputs a video signal correction amount 303. Next, a subtracter 304 subtracts the video signal correction amount 303 from input video signal to generate a correction video signal 305, and outputs the correction video signal 305 to the clamp processing unit 207.

The integrator 302 has a function for calculating the video signal correction amount 303, by dividing an added value of video signals for each pixel unit input from the reference region by a total number of reference region pixels. Calculation processing to be performed inside the integrator 302 is expressed in the Equation 1.

$$\text{Offset} = \Sigma Gi/N \quad \text{(Equation 1)}$$

In Equation 1, $Gi$ denotes pixel signal for each video signal in reference region, $N$ denotes a total number of all pixels in the reference region. A video signal correction amount "Offset" is calculated using the same calculation equation.

Figure 4:
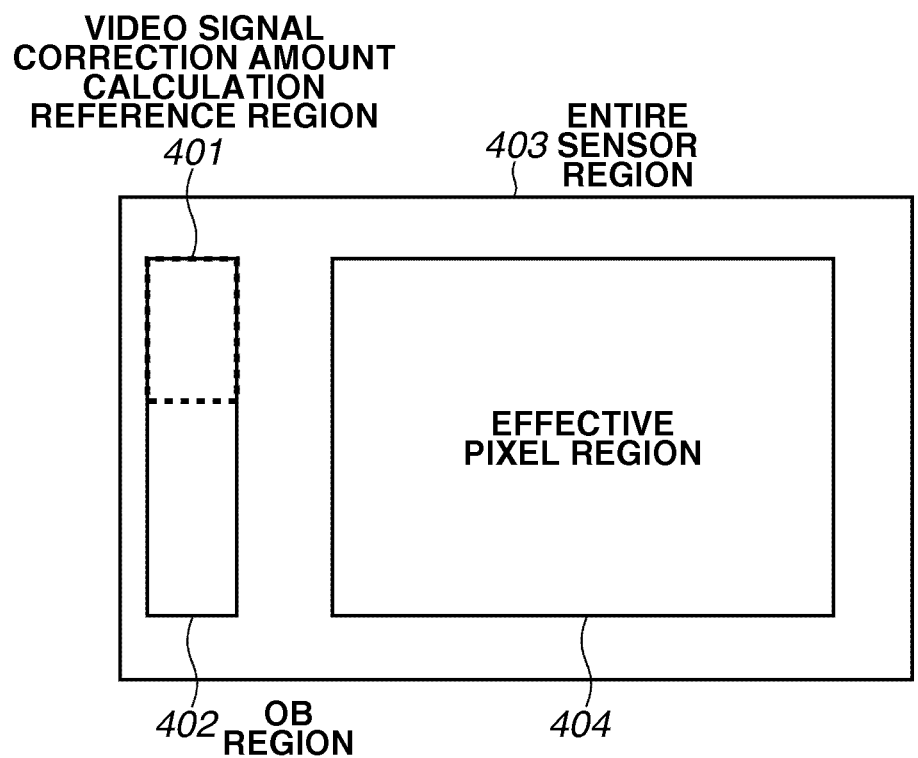
FIG. 4 is an explanatory view of a reference region signal for calculating a video signal correction amount.

FIG. 4 is an explanatory view of a reference region signal for calculating the video signal correction amount 303, illustrated in FIG. 3. A video signal correction amount calculation reference region 401 is a portion of an optical-black region (OB region: optical-black region 402), where a sensor photo transistor is shielded from light by metal or the like, in an entire sensor pixel region 403. The video signal correction unit 206 may calculate an optimal offset correction amount, regardless of photographed products, by using the video signal in the OB region 402 to calculate the video signal correction amount 303. A size (area) of the video signal correction amount calculation reference region 401 is required to secure large region size enough to be able to reduce influences of sensor pixel defects, dark current and shot noise and like, and it is necessary to attain a minimal region size, to reduce calculation amount, and calculation circuit scale. It is necessary to determine a region size assuming service environments of the imaging apparatus system and the imaging apparatus.

Hereinbelow, difference between general clamp processing, and clamp processing performed in the present exemplary embodiment will be described in detail.

FIG. 9 illustrates a conceptual diagram of video signal correction processing generally performed. This conceptual view illustrates an example in a case where video signal correction processing is implemented in a mix of four colors. An average value Ave 903 of four colors is calculated by the video signal correction amount calculation unit 902 disposed in the video signal correction unit 901, and the average value Ave is subtracted uniformly in the subtraction unit 905 from respective color signals. Hence, as seen in FIG. 9, in case where there is level difference for each color by reason of structure of sensor or the like, or by reason of temperature or the like, the video signal is input into the clamp processing unit 906 while only a certain color component (e.g., R-component) 904 has been subtracted too much.

The clamp processing unit 906 is composed of the recursive type filters. If clamping amount is too great, clamping may not be instantaneously performed and a remainder of clamping occurs on a portion of screen. A video signal of the remainder of clamping occurs as a flicker on an upper part of the screen. To prevent such an inconvenience, if the time constant of the recursive filters is set short, the same phenomenon is reduced, but if set too short, the clamp processing unit 906 will respond to random noise of the OB region, and thus normal clamp processing may not be performed in some cases.

Figure 5:
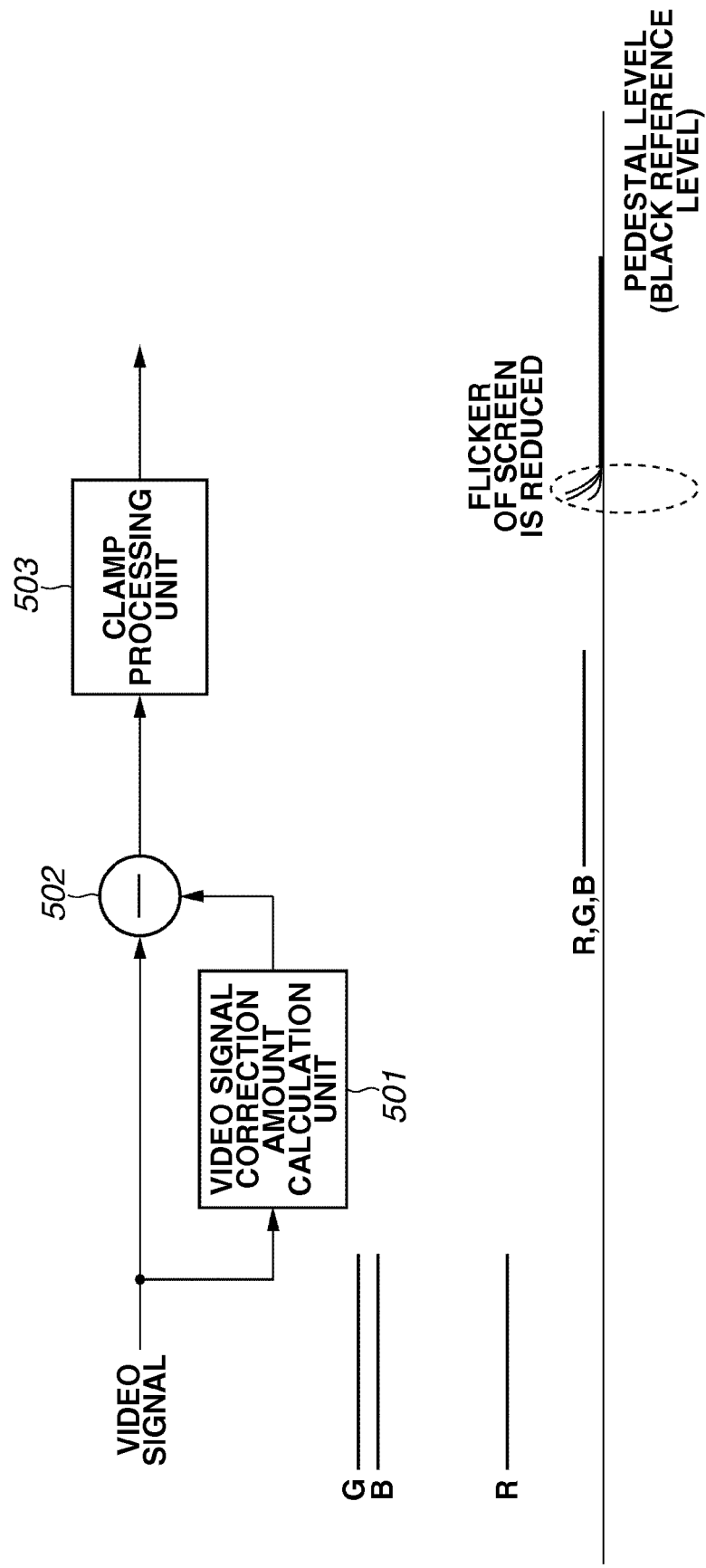
FIG. 5 is a diagram illustrating a concept for calculating a video signal correction amount for each color and performing correction processing.

FIG. 5 is a diagram illustrating a concept of clamp processing performed in the present exemplary embodiment, designed to calculate video signal correction amount for each color, and to implement subtraction from the video signal.

The video signal correction amount calculation unit 501 calculates correction amount for each color. Then, the subtraction unit 502 is designed to subtract the correction amount calculated for each color from the video signal. Accordingly, the video signal after subtraction, as described in FIG. 9, may prevent a phenomenon that level jumps in only one color from occurring. Hence, the clamp processing unit 503, even in a state where the time constant is somewhat great, may withdraw the entire screen to a clamping level at a high speed.

In the present exemplary embodiment, the clamp processing is performed for each color, in a manner as described above. Accordingly, even if the entire video signal is subjected to white float due to shot noise at the time of high temperature, the imaging apparatus surely secures an optical-black level (pedestal level) of normal video signal, and may prevent such a phenomenon that video picture is subjected to white float.

Further, even when a signal level of the OB region 402 exceeds the same range by reason of the dark current and shot noise and the like, the imaging apparatus, even at the time of high temperature, or at the time of high gain, may appropriately perform clamp processing, without exceeding the dynamic range.

Figure 6:
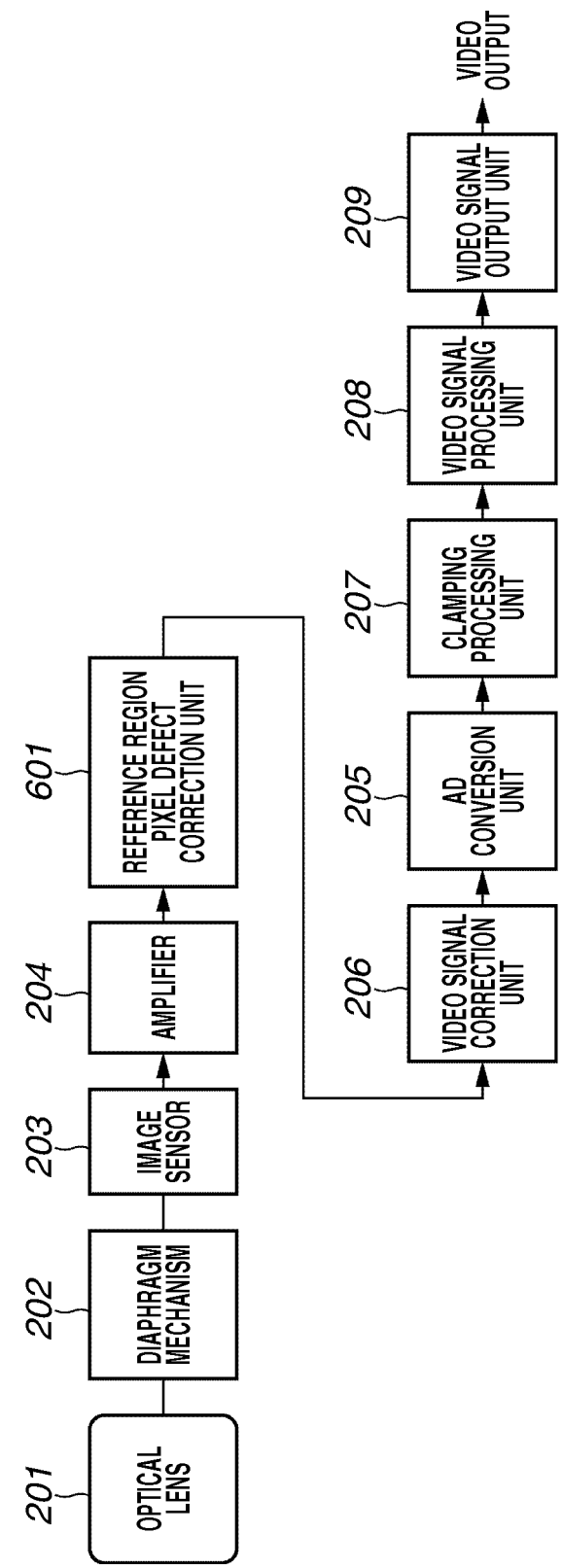
FIG. 6 is a block diagram illustrating a second exemplary embodiment, and illustrating a configuration example of a digital imaging apparatus.

A second exemplary embodiment will be described. Hereinbelow, the second exemplary embodiment according to the present invention will be described. FIG. 6 is a configuration diagram illustrating an outline of the second exemplary embodiment. In the present exemplary embodiment, at the front stage of the video signal correction unit 206 is provided a reference region pixel defect correction unit 601 that implements pixel defect correction processing of the reference region. In FIG. 6, with regard to the configuration except for the reference region pixel defect correction unit 601, the same blocks as those in the configuration explained in FIG. 2 are designated with the same reference numerals, and detailed descriptions thereof are omitted.

For example, in a case where temperature of the image sensor 203 is high, and dark current and shot noise is significant, or in a case where low illuminance object is being captured, and a video signal is amplified by the amplifier 204, pixel defects of the reference region increase. Variable pixel defects also exist among the pixel defects. In that case, a video signal correction amount calculation result by the video signal correction unit 206 may be variable, and accordingly highly accurate clamp processing may not be performed. In the present exemplary embodiment, the reference region pixel defect correction unit 601 is provided at the front stage of the video signal correction unit 206, thereby implementing pixel defect correction processing of the reference region. Accordingly, the video signal correction unit 206 becomes able to calculate the video signal correction amount, while the pixel defects are not present.

A third exemplary embodiment will be described. Hereinbelow, the third exemplary embodiment according to the present invention will be described. Since the configuration of the imaging apparatus according to the present exemplary embodiment is similar to the imaging apparatus explained in FIG. 2, a block diagram illustrating a configuration example thereof is omitted.

The OB region 402 for calculating the video signal correction amount needs to use wider region for the reference region, in a case where the temperature of the image sensor 203 is high, and the dark current and shot noise are significant, or in a case where low illuminance object is being captured, and the video signal is amplified by the amplifier 204. However, in otherwise case, it is not necessary to take wider region.

Figure 7:
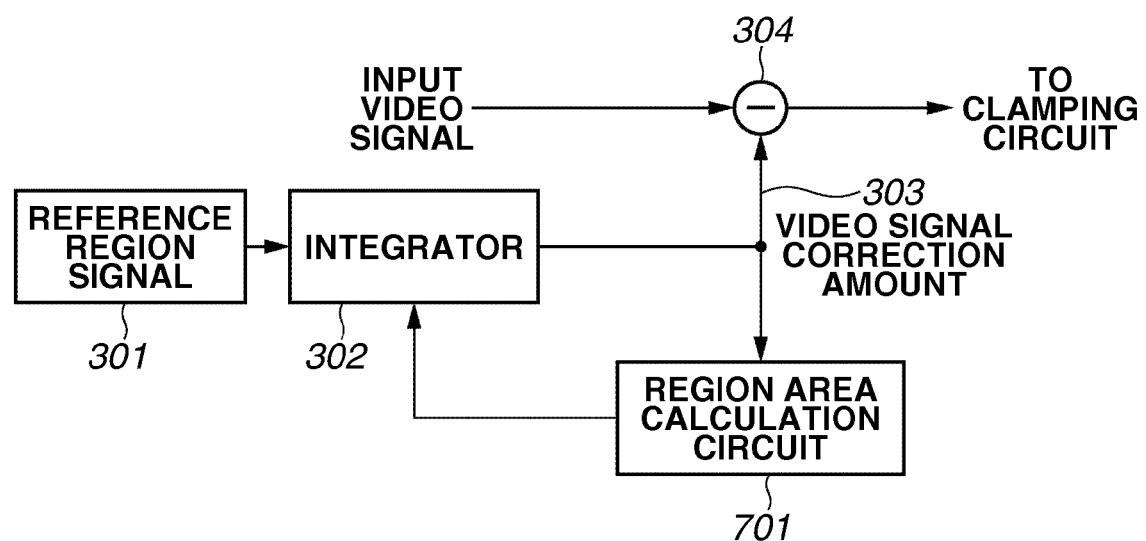
FIG. 7 is a block diagram illustrating another example of a detailed configuration of the video signal correction unit.

To this end, in the present exemplary embodiment, as illustrated in FIG. 7, a region area calculation circuit 701 is provided in the video signal correction unit 206 explained in FIG. 3. The region area calculation circuit 701 is a circuit for calculating an optimal reference region area according to a value of the video signal correction amount. The greater the value of the video signal correction amount becomes, the larger an area for averaging variable pixel defects or noise components of the reference region is made.

Figure 8:
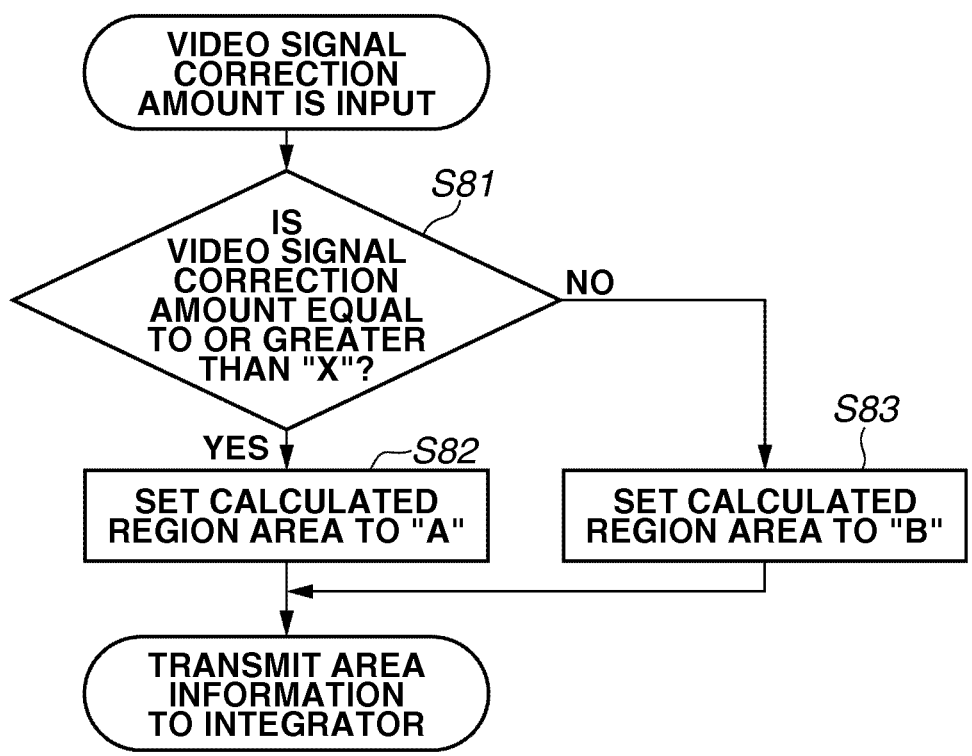
FIG. 8 is a flowchart illustrating an example of determining a size of calculated region area.

Further, like the flowchart illustrated in FIG. 8, a threshold (threshold value "X") may be provided at a certain value of the video signal correction amount, and the reference region area may be changed.

In the example in FIG. 8, in operation S81, the region area calculation circuit 701 determines a magnitude of the correction amount, after the video signal correction amount is input. When the video signal correction amount is equal to or greater than a threshold value "X" (YES in operation S81), advances the processing to operation S82 and sets a calculated region area to "A". On the other hand, when the video signal correction amount is smaller than the threshold value "X" (NO in operation S81), the region area calculation circuit 701 advances the processing to operation S83 and sets the calculated region area to "B". A relationship between "A" and "B" is given by the Equation 2.

$$A > B \qquad \text{(Equation 2)}$$

As apparent from the Equation 2, "A" is greater than "B".

Region area information calculated by the region area calculation circuit 701 is input into the integrator 302, which implements integration processing on only signals within the region on the basis of the same information. By the above-described configuration, it has merit that it becomes possible to perform optimal integration processing depending on situations, unnecessary calculations are reduced, thereby leading to power-saving.

Further, by employing such the configuration, even in a case where a dynamic range of a video signal of an OB unit, which the image sensor 203 outputs, is greater than a dynamic range of a clamping function which an employed video processing apparatus has, there is also merit that they may be easily connected.

Other Embodiments

Aspects of other embodiments of the present invention may also be realized by a computer of a system or apparatus (or devices such as a CPU or MPU) that reads out and executes a program recorded on a memory device to perform the functions of the above-described embodiments, and by a method, the operations of which are performed by a computer of a system or apparatus by, for example, reading out and executing a program recorded or stored on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., an image sensor, an effective pixel region, an optical-black region, an input light signal, an electrical signal, a video signal). In addition, the operations in the method transform the elements or parts from one state to another state. The transformation is particularized and focused on clamp processing. The transformation provides a different function or use such as performing clamp processing, calculating signal information, calculating correction amount, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-242160 filed Oct. 28, 2010 and No. 2011-095166 filed Apr. 21, 2011, which are hereby incorporated by reference herein in their entirety.

What is claimed is:
1. An imaging apparatus comprising:
an image sensor including an effective pixel region and an optical-black region, configured to convert an input light signal into electrical signals;

a clamp processing unit having a dynamic range and configured to perform a clamping operation for clamping image signals, which are converted from the electrical signals, to a black level based on signals outputted from the optical-black region; and a signal correction unit disposed between the image sensor and the clamp processing unit, configured to calculate correction values of the image signals of the effective pixel region based on signals outputted from a part or whole of the optical-black region, and to perform, according to the correction values, correction processing for the image signals so that the image signals fall within the dynamic range of the clamp processing unit, wherein the signal correction unit calculates the correction values independently for each color of the image signals, and performs the correction processing independently for each color of the image signals, and wherein the clamp processing unit performs the clamping operation independently for each color of the image signals.

2. The imaging apparatus according to claim 1, wherein the correction values are integrated values of the signals outputted from the part or whole of the optical-black region.

3. The imaging apparatus according to claim 1, further comprising:
a defect correction unit disposed between the image sensor and the signal correction unit, configured to implement correction processing of pixel defects.

4. The imaging apparatus according to claim 1, further comprising:
a region area calculation unit configured to change a size of a region to calculate the correction values according to the correction values.

5. The imaging apparatus according to claim 1, wherein the signal correction unit performs the correction processing by subtracting the correction values from the image signals before the clamping operation performed by the clamp processing unit.

6. The imaging apparatus according to claim 1, further comprising:
an AD conversion unit configured to convert the electrical signals into the image signals.

7. The imaging apparatus according to claim 1, wherein the clamp processing unit is composed of a recursive type filter circuit.

8. The imaging apparatus according to claim 1, further comprising:
a pixel defect correction unit configured to implement pixel defect correction processing before the correction processing is performed by the signal correction unit.

9. The imaging apparatus according to claim 1, further comprising:
a reference region setting unit configured to set a reference region area in the optical-black region based on the correction values, wherein the signal correction unit calculates the correction values of the image signals of the effective pixel region based on signals outputted from the reference region area set by the reference region setting unit.

10. An imaging method comprising:
performing clamp processing within a dynamic range for clamping image signals, which are converted from electrical signals outputted from an image sensor which includes an effective pixel region and an optical-black region, to a black level;

calculating correction values of the image signals of the effective pixel region based on signals outputted from a part or whole of the optical-black region; and performing, according to the correction values, correction processing for the image signals so that the image signals fall within the dynamic range, wherein the correction values are calculated independently for each color of the image signals, and the correction processing is performed independently for each color of the image signals, and wherein the clamp processing is performed independently for each color of the image signals.

11. A non-transitory computer-readable storage medium storing a control program that, when executed by a computer, causes the computer to perform operations comprising:

performing clamp processing within a dynamic range for clamping image signals, which are converted from electrical signals outputted from an image sensor which includes an effective pixel region and an optical-black region, to a black level;

calculating correction values of the image signals of the effective pixel region based on signals outputted from a part or whole of the optical-black region; and performing, according to the correction values, correction processing for the image signals so that the image signals fall within the dynamic range, wherein the correction values are calculated independently for each color of the image signals, and the correction processing is performed independently for each color of the image signals, and wherein the clamp processing is performed independently for each color of the image signals.

* * * * *